United States Patent
Govindswamy et al.

(10) Patent No.: US 10,681,651 B1
(45) Date of Patent: Jun. 9, 2020

(54) METHOD AND APPARATUS FOR EMISSIONS CONTROL

(71) Applicant: MBIT WIRELESS, INC., Irvine, CA (US)

(72) Inventors: Arumugam Govindswamy, Irvine, CA (US); Bhaskar Patel, San Clemente, CA (US); Sivakumar Govindassamy, Irvine, CA (US)

(73) Assignee: MBIT WIRELESS, INC., Irvine, CA (US)

(*) Notice: Subject to any disclaimer, the term of this patent is extended or adjusted under 35 U.S.C. 154(b) by 207 days.

(21) Appl. No.: 15/472,746

(22) Filed: Mar. 29, 2017

(51) Int. Cl.
*H04W 52/34* (2009.01)
*H04W 52/22* (2009.01)
*H04W 4/80* (2018.01)
*H04W 84/12* (2009.01)

(52) U.S. Cl.
CPC ........ *H04W 52/346* (2013.01); *H04W 4/80* (2018.02); *H04W 52/221* (2013.01); *H04W 52/225* (2013.01); *H04W 84/12* (2013.01)

(58) Field of Classification Search
CPC ... H04W 52/346; H04W 4/80; H04W 52/221; H04W 52/225; H04W 84/12; H04W 52/38; H04W 52/281; H04W 16/32; H04B 5/00; H04B 1/3838
See application file for complete search history.

(56) References Cited

U.S. PATENT DOCUMENTS

| | | | |
|---|---|---|---|
| 9,723,434 B1* | 8/2017 | Chang | H04B 5/00 |
| 2011/0034135 A1* | 2/2011 | Ali | H04B 1/3838 455/103 |
| 2015/0031408 A1* | 1/2015 | Kalla | H04W 52/38 455/522 |
| 2015/0111608 A1* | 4/2015 | Kazmi | H04W 52/281 455/522 |
| 2017/0223694 A1* | 8/2017 | Han | H04W 16/32 |

OTHER PUBLICATIONS

Joseph et al, Downlink electric filed and uplink sar prediction algorithm in indoor wireless network planner, (Year: 2014).*

* cited by examiner

*Primary Examiner* — Vinncelas Louis
(74) *Attorney, Agent, or Firm* — Lerner, David, Littenberg, Krumholz & Mentlik, LLP (57) ABSTRACT

Proximity sensors are used in many user devices to detect a user's proximity to it. The proximity detection may be used to control the transmit power of a wireless device to ensure that the transmit power is in the allowed power range as per various regulatory agencies. A method and apparatus are disclosed that enable adaptive Specific Absorption Rate control according to the combination RF transmit power of the multiple modems.

3 Claims, 9 Drawing Sheets

(Prior Art)

METHOD AND APPARATUS FOR EMISSIONS CONTROL

BACKGROUND

Proximity sensing technology has become popular across a wide range of industries, especially in consumer electronics. The largest applications for proximity sensors within consumer electronics are smartphones, tablets and other mobile devices. These devices are referred to herein as user devices.

The proximity sensing is done for several purposes, some of which may include: (1) reduce display power consumption by turning it off when holding a user device near a human body, (2) disable the touch screen to avoid inadvertent touches by a human body when holding a user device near it and (3) reduce transmit power of a user device to reduce the Specific Absorption Rate (SAR). The SAR is a measure of the rate at which energy is absorbed by a human body when exposed to a Radio Frequency (RF) electromagnetic field. The Federal Communications Commission (FCC) and other regulatory agencies require electronic devices to reduce the RF transmit power of a user device when in close proximity to a human body to keep SAR at or below allowed levels.

Figure 1:
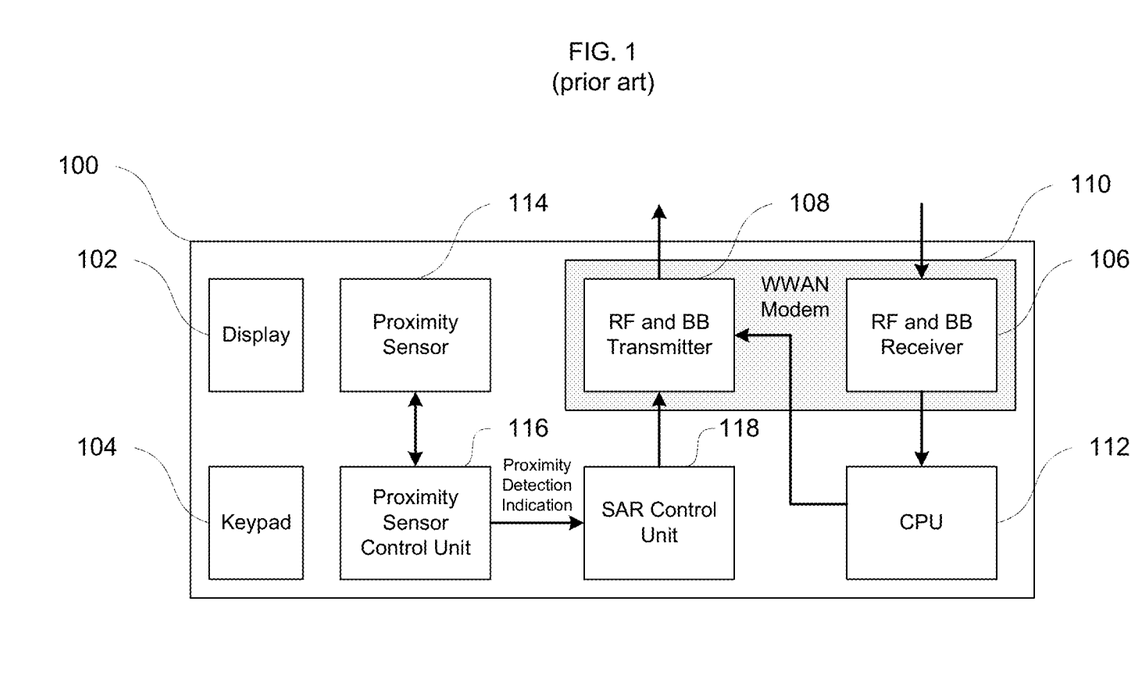
FIG. 1 illustrates a high level block diagram of a user device comprising a display, a keypad, a proximity sensor, and a Wireless Wide Area Network (WWAN) modem.

The capabilities of a user device may vary widely depending on the type of device. For example, a user device may have a capability to communicate with a mobile wireless network based on different radio access technologies (RAT) such as Long Term Evolution (LTE) from the $3^{rd}$ Generation Partnership Project (3GPP), or Code Division Multiple Access (CDMA) from $3^{rd}$ Generation Partnership Project-2 (3GPP2), or Wideband CDMA (WCDMA) from 3GPP, or Global System for Mobile Communications (GSM) from 3GPP, etc. The mobile wireless networks based on these technologies are referred to herein as Wireless Wide-Area Networks (WWAN). A user device may include a WWAN modem for one or more RATs. For example, a user device may include modems for 3GPP LTE and 3GPP WCDMA RATs. A high level block diagram of a portion of a generic user device 100 with WWAN support is shown in FIG. 1. It comprises a display 102, a keypad 104, an RF and baseband (BB) receiver 106 for WWAN, an RF and BB transmitter 108 for WWAN. The RF and BB receiver 106 and RF and BB transmitter 108 for WWAN are together referred to herein as WWAN modem 110. The user device 100 also comprises a Central Processing Unit (CPU) 112 for overall control of the device. The user device 100 also comprises the proximity sensor 114, the Proximity Sensor Control Unit 116, and the SAR Control Unit 118. The Proximity Sensor Control Unit may perform proximity detection by controlling the proximity sensor, making measurements and outputting proximity detection results. The SAR Control Unit accepts the inputs from Proximity Sensor Control Unit and determines whether any reduction in RF transmit power is required.

Figure 2:
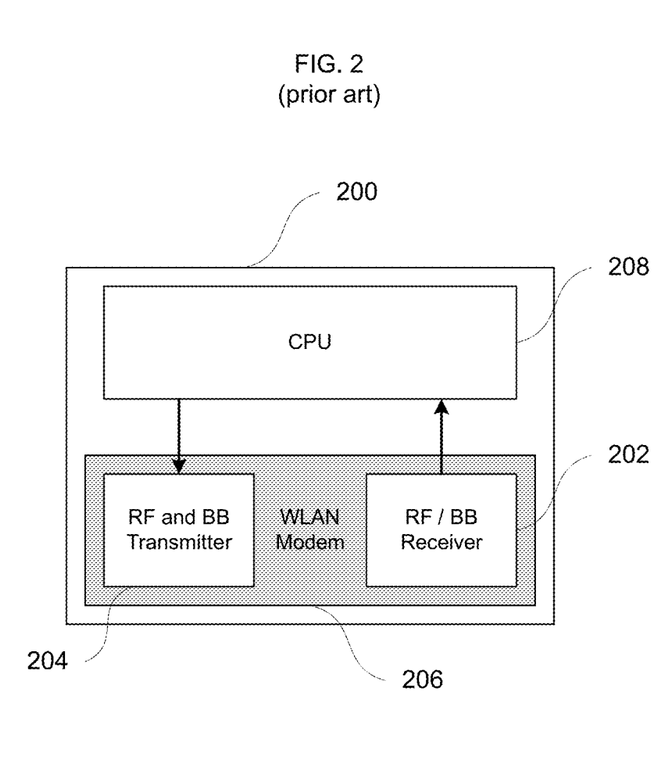
FIG. 2 illustrates a high level block diagram of a user device comprising a Wireless Local Area Network (WLAN) modem.

A user device may support communication over a Wireless Local Area Networks (WLAN). One of the most commonly used WLAN technology is based on the IEEE 802.11 standards and it is also commonly known as Wi-Fi. The terms WLAN and Wi-Fi may be used interchangeably herein. A high level block diagram of a portion of a generic user device 200 with WLAN support is shown in FIG. 2. The user device 200 comprises an RF and BB receiver 202 for WLAN, an RF and BB transmitter 204 for WLAN. The RF and BB receiver 202 and RF and BB transmitter 204 for WLAN are together referred to herein as WLAN modem 206. The user device 200 also comprises a CPU 208 for overall control of the device. The maximum RF transmit power for Wi-Fi may be up to 20 dBm as per FCC regulations. It may vary depending on regional regulatory requirements.

Figure 3:
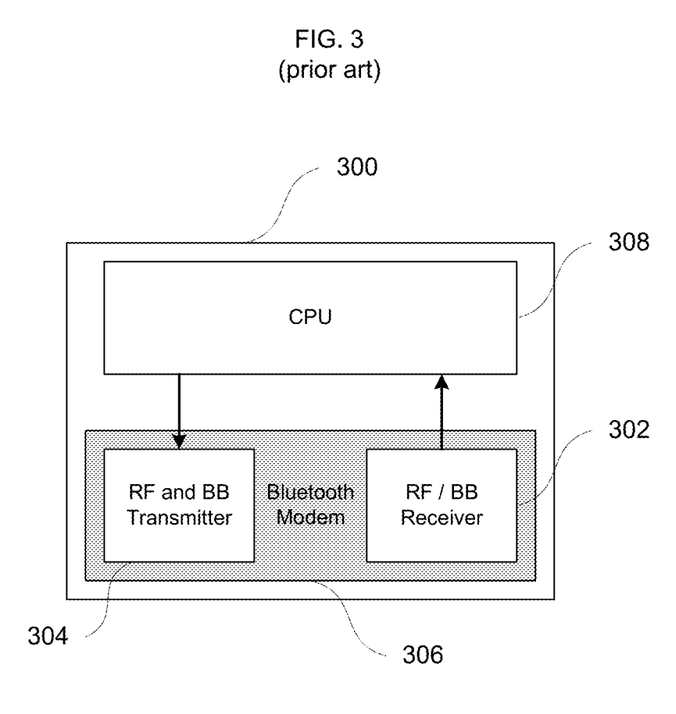
FIG. 3 illustrates a high level block diagram of a user device comprising a Bluetooth modem.

A user device may support wireless link over a Bluetooth protocol for communicating with other devices in a Personal Area Network (PAN). A high level block diagram of a portion of a generic user device 300 with Bluetooth support is shown in FIG. 3. The user device 300 comprises an RF and BB receiver 302 for Bluetooth, an RF and BB transmitter 304 for Bluetooth. The RF and BB receiver 302 and RF and BB transmitter 304 for Bluetooth are together referred to herein as Bluetooth modem 306. The user device 300 also comprises a CPU 308 for overall control of the device. Bluetooth may be classified as Class-1, Class-2 or Class-3 with maximum RF transmitter power of 20 dBm, 4 dBm, and 0 dBm respectively.

The maximum RF transmit power of modems for some radio access technologies may not be high enough to require any RF power reduction to meet SAR requirements. For example, Class-2 and Class-3 Bluetooth devices have very low maximum RF transmit power and therefore SAR requirements can be met without any RF power reduction. In such cases, there may not be a need for user proximity detection. The maximum RF transmit power of modems for some radio access technologies may be high enough to require RF power reduction to meet SAR requirements. For example, the maximum RF transmit power for a user device in a 3GPP LTE WWAN system is 23 dBm and in a GSM system is 33 dBm.

When a user device is performing a particular activity it may be described as being in a particular state. For example, when a user device is actively performing data transfer with a network, it may be considered to be in Active state. For the purpose of proximity detection and SAR control, an Active state may also be defined as a state whenever RF Transmitter of a WWAN modem or a WLAN modem is on. Similarly, when a user device is not performing any data transfer with a network and not performing any other activity, it may be considered to be in Idle state. A user device may be in some other intermediate state depending on a particular scenario. Similarly, different subsystems of a user device may be in different states. For example, the WWAN modem may be in Active state or Idle state. Similarly, a WLAN modem, a Bluetooth modem, or a proximity sensor subsystem may be in Active or Idle state. The specific names used for the states for different subsystems may vary but the general idea remains the same. The power consumption of a subsystem may be different depending on the state it is in.

Different parts of a user device may be in different states depending on the prevailing scenario. For example, when a user device with WWAN modem in FIG. 2 is not performing any active data transfer over WWAN, the WWAN modem may be in Idle state. When a user device is performing active data transfer over WWAN, the WWAN modem may be in Active state. Similarly, when a proximity sensor is powered on and actively scanning for possible presence of a user nearby, it may be in Active state. Otherwise, it may be in Idle state. In Idle state of the proximity sensor, the power supply to it may be disabled.

In a conventional user device, the SAR control may be fixed based on the RF transmit power levels of the modem in the user device.

SUMMARY

A method and apparatus are disclosed for adaptive SAR control according to combined RF transmit power of multiple modems. The present disclosure may be applied to any user device that employs an RF transmitter and a proximity type of sensor.

In accordance with an aspect of the present disclosure, a method for emission control at a wireless communication device may include controlling, by a processing device at the wireless communication device, when proximity of a user to the wireless communication device is detected, reducing radio frequency (RF) transmit power of the wireless communication device to satisfy a predetermined emission requirement, according to a total RF power $P_{TX\_TOTAL}$ including a first RF power of a RF transmitter in a Wireless Wide-Area Network (WWAN) modem and a second RF power of an RF transmitter in a Wireless Local Area Network (WLAN) modem of the wireless communication device.

In one alternative, the total RF power $P_{TX\_TOTAL}$ may include given RF powers respectively of a plurality of modems of the wireless communication device, and the method may include controlling, by the processing device, reducing the given RF transmit powers respectively of the plurality of modems proportionally such that the total RF power $P_{TX\_TOTAL}$ satisfies the predetermined emission requirement.

In one alternative, the total RF power $P_{TX\_TOTAL}$ may be a sum of a given RF transmit power of each modem in the wireless communication device determined to be active.

In one alternative, the each modem may include a Bluetooth modem.

In one alternative, the first and second RF powers may be reduced autonomously to satisfy the predetermined emission requirement.

In one alternative, the predetermined emission requirement may be satisfied by reducing the first RF power within a predetermined allowed tolerance of a power control requirement of a WWAN while a RF transmitter power level commanded by the WWAN is maintained at the WWAN modem.

In one alternative, the total RF power $P_{TX\_TOTAL}$ may include given RF powers respectively of a plurality of modems of the wireless communication device, and the method may include controlling, by the processing device, reducing one or more of the given RF transmit powers respectively of the plurality of modems such that the total RF power $P_{TX\_TOTAL}$ satisfies the predetermined emission requirement.

In one alternative, the predetermined emission requirement may be satisfied by reducing given RF transmit power of a given RF transmitter in a given modem in the wireless communication device according to user preference.

In one alternative, the method may further include controlling, by the processing device, when a power control command for a given modem of a plurality of modems in the wireless communication device is received, determining whether RF transmit power reduction is required at any of the modems to satisfy the predetermined emission requirement based on the power control command.

In one alternative, the method may further include controlling, by the processing device, determining a reduced RF transmit power of the wireless communication device that satisfies the predetermined emission requirement based on an average RF transmit power at the wireless communication device over a predetermined period of time.

In one alternative, the method may further include controlling, by the processing device, when the wireless communication device is tethered by a cable to another device, reducing the RF transmit power of the wireless communication device according to a first emission requirement different from a second emission requirement, and reducing the RF transmit power of the wireless communication device based on the second emission requirement, when RF transmission is from a given modem of the wireless communication device and the another device is not tethered to the wireless communication device.

In one alternative, the another device may be a computer or headset.

In one alternative, the method may further include controlling, by the processing device, when the wireless communication device is in a voice call and using a speakerphone mode, reducing the RF transmit power of the wireless communication device according to a first emission requirement different from a second emission requirement, and reducing the RF transmit power of the wireless communication device based on the second emission requirement, when the wireless communication device is not in a voice call and using the speakerphone mode.

In one alternative, the predetermined emission requirement may be in accordance with operating frequency of RF transmission at the wireless communication device.

In one alternative, the wireless communication device may be operable in a plurality of different RF bands, and wherein the predetermined emission requirement may be a different given emission requirement for each of the different RF bands.

In one alternative, the predetermined emission requirement may be in accordance with a duplexing method used at the wireless communication device.

In one alternative, the wireless communication device may be operable with a plurality of different duplexing methods, and wherein the predetermined emission requirement may be a different given emission requirement according to downlink and uplink partitioning of RF channel usage for each of the different duplexing methods.

In one alternative, the different duplexing methods include Time Division Duplexing and Half-duplex Frequency Division Duplexing.

In accordance with an aspect of the present disclosure, an apparatus for emission control at a wireless communication device may include circuitry configured to control, when proximity of a user to the wireless communication device is detected, reducing radio frequency (RF) transmit power of the wireless communication device to satisfy a predetermined emission requirement, according to a total RF power $P_{TX\_TOTAL}$ including a first RF power of a RF transmitter in a Wireless Wide-Area Network (WWAN) modem and a second RF power of an RF transmitter in a Wireless Local Area Network (WLAN) modem of the wireless communication device.

In accordance with an aspect of the present disclosure, a wireless communication device may include a receiver to receive a wireless communication; and a processing device configured for emission control at the wireless communication device, wherein the processing device may be configured to control: when proximity of a user to the wireless communication device is detected, reducing radio frequency (RF) transmit power of the wireless communication device to satisfy a predetermined emission requirement, according to a total RF power $P_{TX\_TOTAL}$ including a first RF power of a RF transmitter in a Wireless Wide-Area Network (WWAN) modem and a second RF power of an RF transmitter in a Wireless Local Area Network (WLAN) modem of the wireless communication device.

DETAILED DESCRIPTION

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Figure 4:
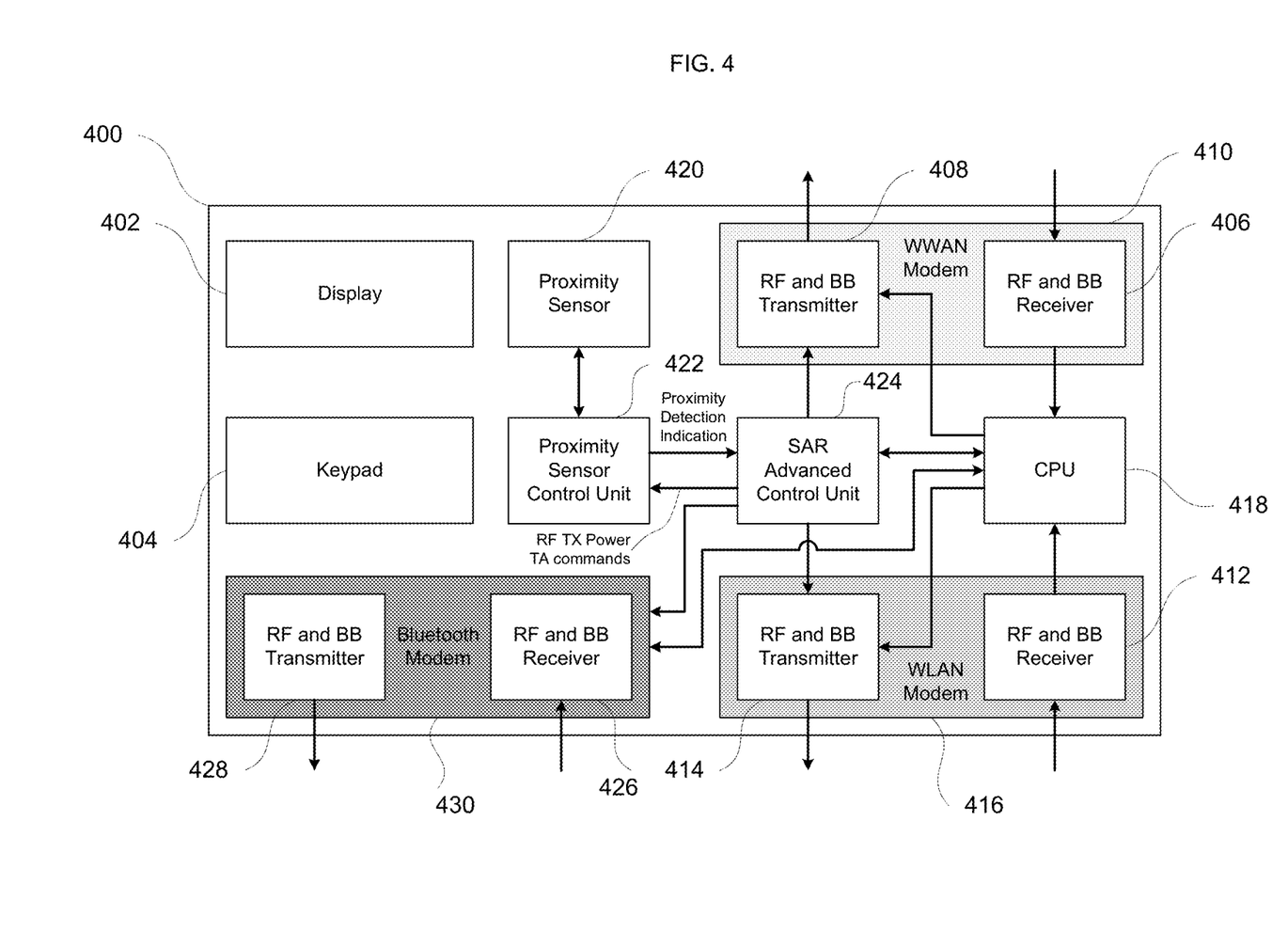
FIG. 4 illustrates a high level block diagram of a user device comprising a display, a keypad, a WWAN modem, a WLAN modem, a Bluetooth modem, a proximity sensor, a Proximity Sensor Control Unit, and a Specific Advanced Absorption Rate (SAR) Advanced Control Unit according to the aspects of the present disclosure.

A user device that employs proximity sensor and SAR control according to the aspects of the present disclosure is illustrated in FIG. 4. The user device 400 in FIG. 4 comprises a display 402, a keypad 404, a WWAN RF and BB receiver 406, and a WWAN RF and BB transmitter 408. The WWAN RF and BB receiver 406 and the WWAN RF and BB transmitter 408 together are referred to as WWAN modem 410. The user device 400 also comprises a WLAN RF and BB receiver 412 and a WLAN RF and BB transmitter 414. The WLAN RF and BB receiver 412 and the WLAN RF and BB transmitter 414 together are referred to as WLAN modem 416. The user device 400 also comprises a Bluetooth RF and BB receiver 426 and a Bluetooth RF and BB transmitter 428. The Bluetooth RF and BB receiver 426 and the Bluetooth RF and BB transmitter 428 together are referred to as Bluetooth modem 430. The user device 400 comprises one or more proximity sensor 420 for sensing proximity between the user and the user device and a CPU 418 for overall control of the device. The user device 400 also comprises the Proximity Sensor Control Unit 422 and the SAR Advanced Control Unit 424 implemented according to the aspects of the present disclosure.

Different parts of a user device may be in different states depending on the prevailing scenario. For example, when the user device 400 in FIG. 4 with WWAN modem is not performing any active data transfer over WWAN, the WWAN modem may be in Idle state. When the user device 400 in FIG. 4 is performing active data transfer over WWAN, the WWAN modem may be in Active state. Similarly, when the user device 400 in FIG. 4 is not performing any active data transfer over WLAN, the WLAN modem may be in Idle state. When the user device 400 in FIG. 4 is performing active data transfer over WLAN, the WLAN modem may be in Active state. Similarly, when the user device 400 in FIG. 4 is not performing any active data transfer over Bluetooth with another device in a PAN, the Bluetooth modem may be in Idle state. When the user device 400 in FIG. 4 is performing active data transfer over Bluetooth with another device in a PAN, the Bluetooth modem may be in Active state.

In some scenarios, both the WWAN modem and WLAN modem may be in Active state.

For example, in case a user device is capable of supporting a mobile Hotspot functionality, it may get internet service over WWAN modem and distribute it to other nearby devices over WLAN modem. In this case, the WLAN modem may serve as an Access Point. When the user device is distributing internet service to other nearby client devices, it may be considered to be operating in hotspot mode. The nearby client devices that are connected to the hotspot are considered to be tethered to the hotspot. In the hotspot mode with several client devices tethered to it, the average RF transmission power of a hotspot, and therefore the total RF transmit power $P_{TX\_TOTAL}$ of the user device, may be higher than a normal Wi-Fi client mode use case. In some scenarios, all three modems may be in Active state. For example, user may be listening to music over Bluetooth while accessing internet from WWAN through the WLAN which may be serving as a hotspot (Access Point).

According to an aspect of the present disclosure, if user proximity is detected, the RF transmit power reduction for meeting SAR requirements may be performed according to the total power $P_{TX\_TOTAL}$ of WWAN RF transmitter and WLAN RF transmitter. For example, the WWAN RF transmitter power and WLAN RF transmitter power may be individually below the RF power level $THR_a$ to meet the SAR requirements but RF transmit power of the two modems together may exceed the SAR requirements. The $THR_a$ may be obtained from SAR measurements made on a user device when it is operating in different modes with different RF transmit power levels during the calibration, certification and regulatory approval process. The SAR Advanced Control Unit 424 in FIG. 4 may proportionally reduce the RF transmit power of each of the modems to maintain the total RF transmit power $P_{TX\_TOTAL}$ to a level so that the SAR requirements are met. According to another aspect of the present disclosure, the RF transmit power reduction may be performed according to the total power of all the active modems in a user device including Bluetooth, WWAN, WLAN, and any other modem (not mentioned in FIG. 4).

According to another aspect of the present disclosure, the particular combination of reduction in RF transmitter power across different modems in a user device may be selected autonomously. For example, the required RF transmitter power reduction may be achieved by reducing the RF transmit power of the WLAN modem alone. In another example, the required RF transmitter power reduction may be achieved by a combination as follows: a portion of the reduction may be achieved by reducing the RF transmitter power of the WWAN modem and the remaining portion of the required RF transmitter power reduction may be achieved by reducing WLAN RF transmitter power. In another example, WWAN RF transmitter power may be reduced within the allowed tolerance of the power control requirements of the respective WWAN specifications while maintaining commanded RF transmitter power level by the network. For example, if the network commands a user device to transmit at power level X dBm, the user device may be allowed to transmit within X±Δ dBm RF power according to the WWAN specifications. For example, in case of 3GPP LTE WWAN, the allowed tolerance may be Δ=±2.5 dB. In this case, the user device may reduce its RF transmitter power down to X−2.5 dBm level. The SAR Advanced Control Unit 424 may make selection amongst the available options for reducing total RF transmit power based on the prevailing scenarios.

According to another aspect of the present disclosure, the particular combination of reduction in RF transmitter power across different modems in a user device may be according to user preference. For example, a user may indicate that the RF power of the WWAN RF transmitter be reduced first to meet the SAR requirements and the WLAN and Bluetooth RF transmit power may not be reduced. In another example, a user may indicate that the RF transmit power of the WLAN RF transmitter may be reduced first to meet the SAR requirements and then, if required, the power of Bluetooth RF transmitter may be reduced and then, if required, the WWAN RF transmit power may be reduced. The user preference for the order of reduction in RF transmitter power may be a one-time configuration which may be retained until changed again whenever decided by the user.

According to an aspect of the present disclosure, when a power control command for any one of the modems is received from its respective network, the RF transmit power reduction of the user device may be reevaluated. For example, if WLAN modem is instructed to reduce its RF transmit power by the network, it may reduce total power of a user device as well which in turn may allow the user device to remove the previously applied reduction in RF transmit power of the WWAN modem RF transmitter. Similarly, if the WWAN modem is instructed to reduce its RF transmit power by the network, that may reduce the total power of a user device as well which in turn may allow the user device to remove the previously applied reduction in RF transmit power of the WLAN modem RF transmitter.

The nature of data traffic for different applications may be different. For example, in case of a voice call or video call the data traffic may be steady and the RF transmit power may remain steady for some period of time. For internet data traffic such as web browsing, messaging, etc., the data traffic may be bursty, i.e., there may be a lot of data transfer for a short time followed by a period of inactivity. According to another aspect of the present disclosure, the RF transmit power level at which reduction in RF transmit power for SAR requirements may be obtained by averaging the RF transmit power over a configurable period of time.

Figure 5:
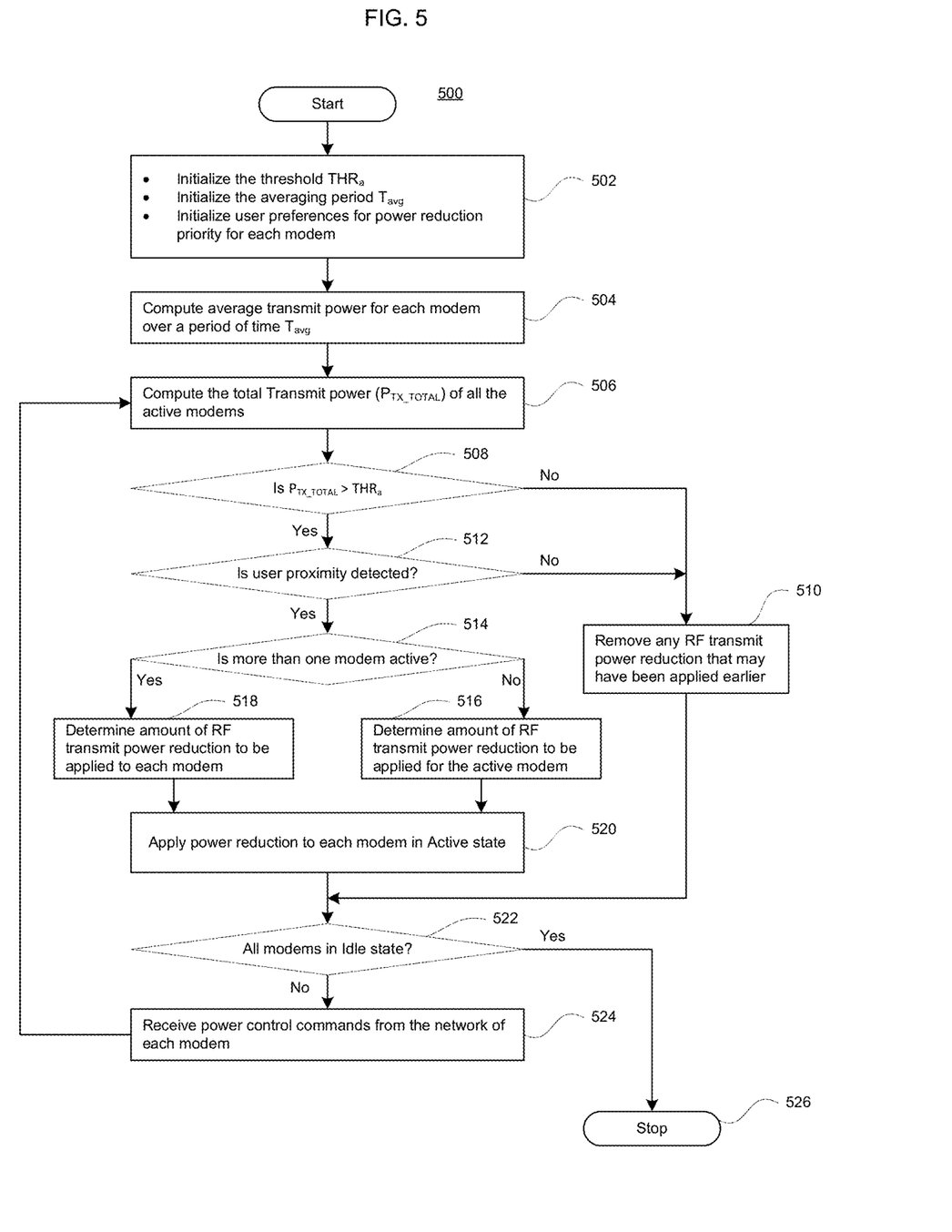
FIG. 5 illustrates an example flow diagram for RF transmit power control to meet SAR requirements according to the aspects of the present disclosure.

Some of the aspects of the RF transmit power control to meet the SAR requirements are illustrated in the flow diagram 500 contained in FIG. 5. The processing relevant to the present disclosure begins at processing stage 502 which initializes the configurable parameters. Specifically, the threshold $THR_a$ above which the RF transmit power reduction may be required for meeting SAR requirements is configured based on values obtained from measurements. The averaging period $T_{avg}$ for averaging the RF transmit power over certain duration is also configured. Finally, the user preferences for priority order in which the RF transmit power reduction may be applied to meet the SAR requirements may be configured. At processing stage 504, the average RF transmit power for each modem in Active state is computed. The averaging takes into account the duty cycle of the RF transmission activity. For example, transmission may occur only once for 1 ms for every 10 ms. In this case the average transmit power over 10 ms is reduced by 10 dB compared to the 1 ms period during which the actual RF transmission takes place. At processing stage 506, the total transmit power $P_{TX\_TOTAL}$ of all the active modems may be computed. At processing stage 508, a determination is made whether the total RF transmit power $P_{TX\_TOTAL}$ is above the configured threshold $THR_a$. If the total RF transmit power $P_{TX\_TOTAL}$ is below the configured threshold $THR_a$, any previously applied RF transmit RF power reduction may be removed in processing stage 510 as long as the total RF transmit power $P_{TX\_TOTAL}$ remains below the configured threshold $THR_a$. Next the processing continues to processing stage 522. Returning to the processing stage 508, if the total RF transmit power $P_{TX\_TOTAL}$ is above the configured threshold $THR_a$, the processing continues to the stage 512. At processing stage 512, if user proximity is not detected, the processing continues to processing stage 510 as described earlier. Otherwise, the processing continues at processing stage 514. At processing stage 514, determination is made whether a single modem is active or more than one modem is active. If a single modem is active, the processing continues to the stage 516, otherwise, the processing continues to the stage 518. At processing stage 516, the required amount of RF transmit power reduction is computed and output to the processing stage 520. If multiple modems are active, at processing stage 518, the required amount of RF transmit power reduction for each active modem according to the user configured priority or according to the autonomous proportional reduction for each modem is determined and output to the processing stage 520. At processing stage 520, the RF transmit power reduction determined from earlier steps is applied to each active modem. At processing stage 522, it is checked whether all modems are in Idle state or not. If all the modems are not in Idle state, the processing continues to stage 524, where check for reception of any power control commands from the network of any of the active modems is performed and if such RF power control commands are received, the processing returns to the processing stage 506. If all the modems are in Idle state, the processing suitably terminates at stage 526.

According to another aspect of the present disclosure, when a user device is tethered to another device, for example using a USB cable to connect to a Host computer, the SAR Advanced Control Unit may use different configurable thresholds for SAR control. Similarly, when an accessory device, such as a headset, is attached to a user device the SAR Advanced Control Unit may use different configurable thresholds for SAR control.

According to another aspect of the present disclosure, when a user device is in a voice call and using speakerphone mode, the SAR Advanced Control Unit may use different configurable thresholds for SAR control.

The SAR may vary as a function of the operating frequency RF transmission of a user device. User devices may operate in a number of different RF bands. According to an aspect of the present disclosure, the SAR Advanced Control Unit may use different configurable thresholds for SAR control for each RF frequency band.

Duplexing refers to the ability to provide bidirectional communication in a wireless communication system, i.e., from a base station of a wireless communication system to user devices, i.e., Downlink (DL) and from user devices to base station, i.e., Uplink (UL). There are different methods for providing bidirectional communication. One of the commonly used duplexing methods is Frequency Division Duplexing (FDD). In FDD wireless communication systems, two different frequencies, one for DL and another for UL are used for communication. In a FDD wireless communication system, the client devices may be receiving and transmitting simultaneously. Furthermore, the client devices may be transmitting continuously.

Another commonly used method for duplexing is Time Division Duplexing (TDD). In TDD based wireless communication systems, the same exact frequency is used for communication in both DL and UL. In TDD wireless communication systems, the client devices may be either receiving or transmitting but not both simultaneously. The use of the Radio Frequency (RF) channel for DL and UL may alternate on periodic basis. For example, in every 5 ms time duration, during the first half, the RF channel may be used for DL and during the second half the RF channel may be used for UL. Unlike FDD systems, the client device may not be transmitting continuously in TDD systems. In some communication systems the time duration for which the RF channel is used for DL and UL may be adjustable and may be changed dynamically.

Yet another commonly used duplexing method is Half-duplex FDD (H-FDD). In this method, different frequencies are used for DL and UL but the client devices may not perform receive and transmit operations at the same time. Similar to TDD wireless communication systems, a client terminal using H-FDD method may periodically switch between DL and UL operations. For example, in every 5 ms time duration, during the first half, DL operation may be performed and during the second half, UL operation may be performed.

The SAR may be computed by averaging the measurements over a relatively long duration, e.g., in the order of seconds or minutes. Therefore, the average transmit power of a client device in case of a TDD or H-FDD system may be considerably less than the peak power when a client device is transmitting in UL. According to an aspect of the present disclosure, the SAR Advanced Control Unit may use different configurable thresholds for SAR control for each different duplexing method. According to another aspect of the present disclosure, the configurable thresholds may be adapted and tuned according to the specific DL and UL partitioning of the RF channel usage in a TDD or H-FDD system. Use of configurable thresholds adaptation for TDD or H-FDD may enable a client device to meet the SAR requirements at a higher instantaneous transmit power level.

Aspects of the present disclosure may be applied to all types of user devices for mobile communications systems such as systems based on 3GPP LTE wireless communication standard, systems based on 3GPP Wideband Code Division Multiple Access (WCDMA) standard, systems based on 3GPP2 Code Division Multiple Access (CDMA) standard, WLAN systems based on an IEEE 802.16 wireless communication standard, etc.

Figure 6:
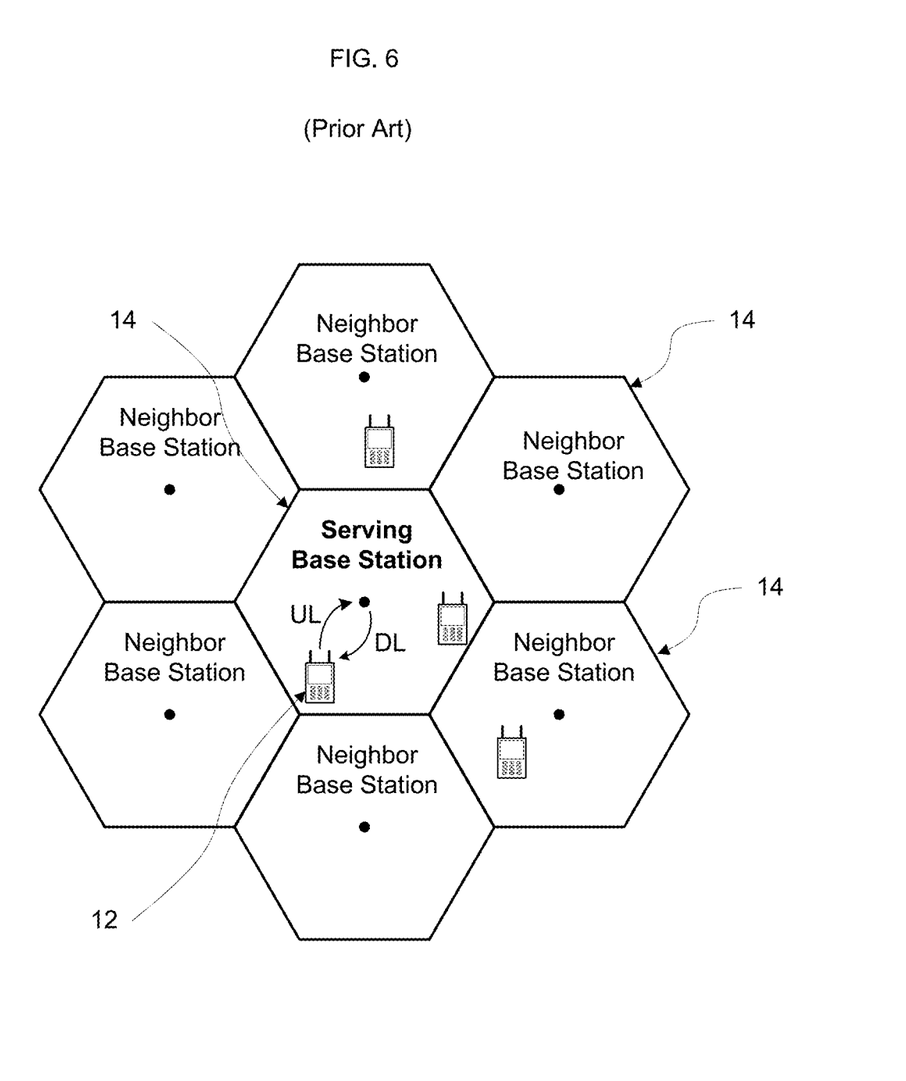
FIG. 6 illustrates a conventional mobile wireless communication system.

Typically, as shown in FIG. 6, a wireless communication system comprises elements such as client terminals or mobile stations and one or more base stations. The terms client terminals or mobile stations or client devices are used interchangeably herein with the term user devices. Other network devices may also be employed, such as a mobile switching center (not shown). As illustrated in FIG. 6, the communication path from the base station (BS) to the client terminal or mobile station (MS) is referred to herein as a downlink (DL) direction or downlink channel, and the communication path from the client terminal to the base station is referred to herein as an uplink (UL) direction or uplink channel. In some wireless communication systems, the MS communicates with the BS in both the DL and UL directions. For instance, such communication is carried out in cellular telephone systems. In other wireless communication systems, the client terminal communicates with the base stations in only one direction, usually the DL. Such DL communication may occur in applications such as paging. As used herein, the terms "base station" and "network" are used interchangeably.

By way of example only, the above-described method may be implemented in a user device such as a wireless mobile station (MS) 12 as shown in FIG. 6 operating in a wireless communication system.

Figure 7:
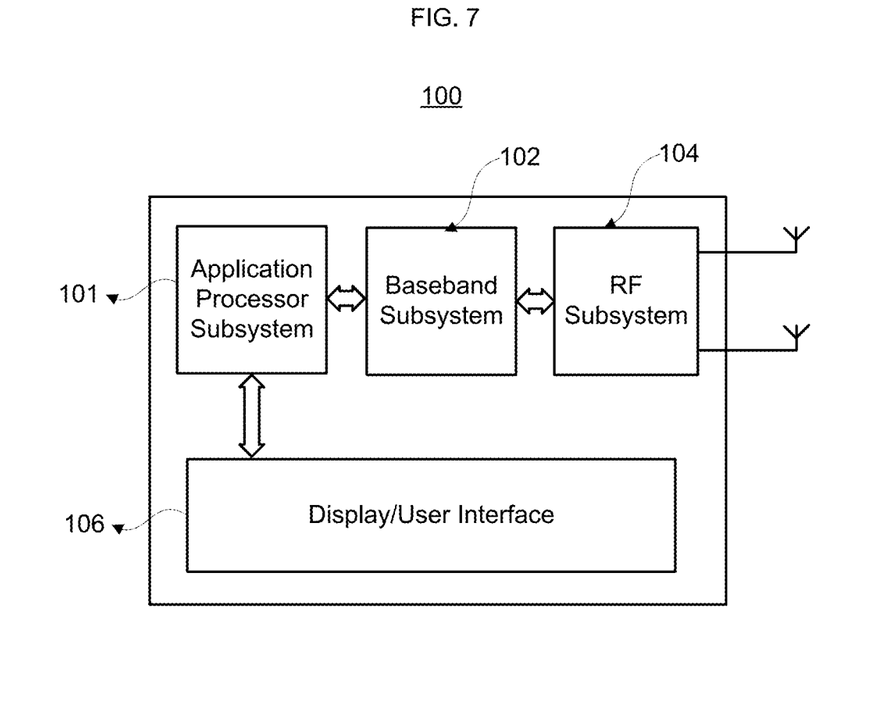
FIG. 7 illustrates a wireless mobile station diagram, which may be employed with aspects of the disclosure described herein.

As shown in FIG. 7, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 8:
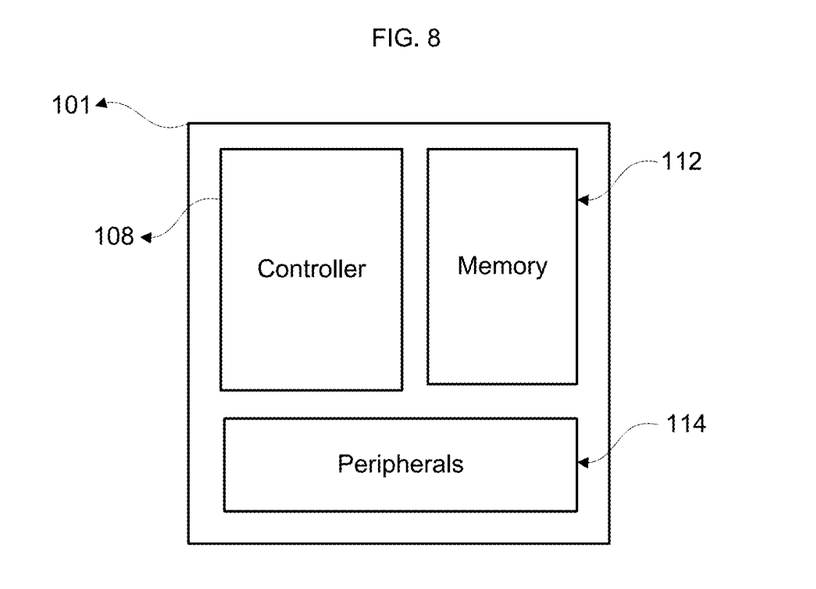
FIG. 8 illustrates an application processor subsystem for a wireless mobile station, which may be employed with aspects of the disclosure described herein.
Figure 9:
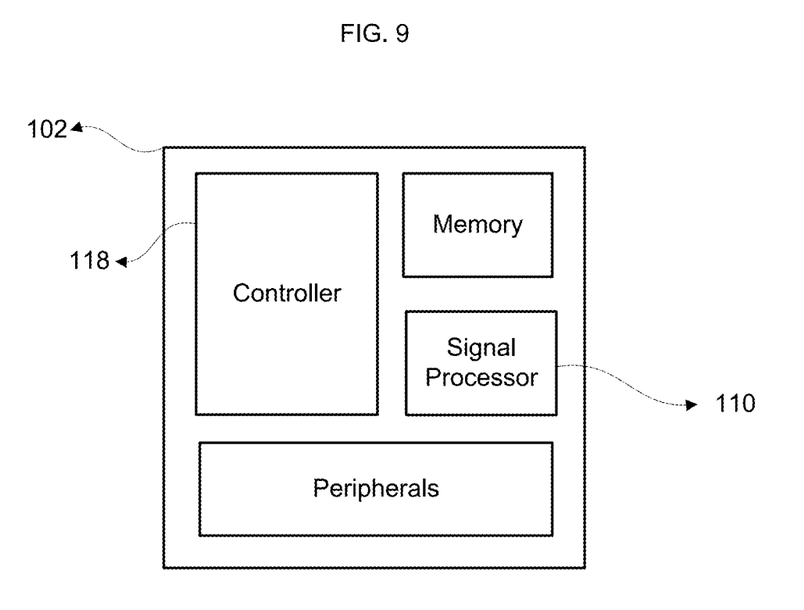
FIG. 9 illustrates a baseband subsystem for a wireless mobile station, which may be employed with aspects of the disclosure described herein.
Figure 10:
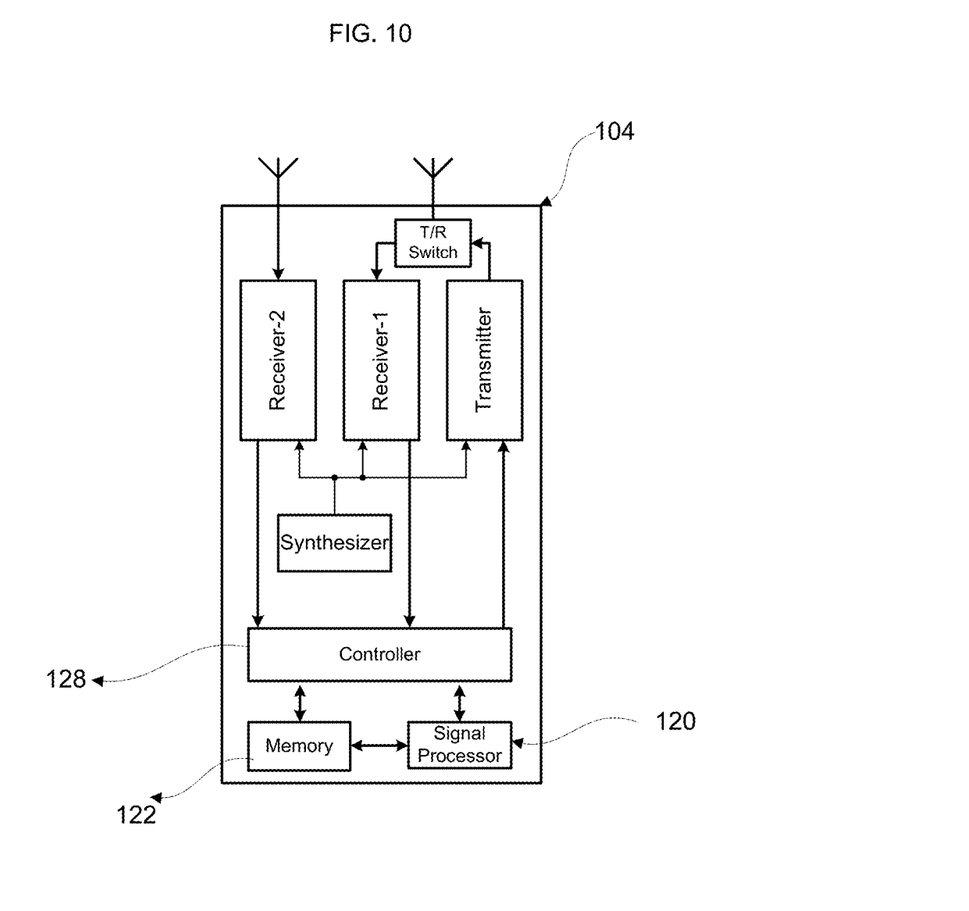
FIG. 10 illustrates an RF subsystem for a wireless mobile station, which may be employed with aspects of the disclosure described herein.

The application processor subsystem 101 as shown in FIG. 8 may include a controller 108 such as a microcontroller, another processor or other circuitry. The baseband subsystem 102 as shown in FIG. 9 may include a controller 118 such as a microcontroller or other processor. The RF subsystem 104 as shown in FIG. 10 may include a controller 128 such as a microcontroller, another processor or other circuitry. The controller 108 in FIG. 8 desirably handles overall operation of the MS 100. This may be done by any combination of hardware, software and firmware running on the controller 108. Such a combination of hardware, software and firmware may embody any methods in accordance with aspects of the present disclosure.

In FIG. 8 the peripherals 114 such as a full or partial keyboard, video or still image display, audio interface, etc may be employed and managed through the controller 108.

Aspects of the present disclosure may be implemented in firmware of the controller 108 of the application processor illustrated in FIG. 8 and/or the controller 118 of the baseband subsystem illustrated in FIG. 9. In another alternative, aspects of the present disclosure may also be implemented as a combination of firmware and hardware of the application processor subsystem 101 and/or the baseband subsystem 102. For instance, a signal processing entity of any or all of the FIG. 9 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for emission control at a wireless communication device, the method comprising:
　controlling, by a processing device at the wireless communication device,
　　when proximity of a user to the wireless communication device is detected, reducing radio frequency (RF) transmit power of the wireless communication device to satisfy a predetermined emission requirement, wherein an amount of reduction in RF transmit power is determined according to a total RF power $P_{TX\_TOTAL}$ including a first RF power of an RF transmitter in a Wireless Wide-Area Network (WWAN) modem and a second RF power of an RF transmitter in a Wireless Local Area Network (WLAN) modem of the wireless communication device,
　　when the wireless communication device is tethered by a cable to another device, reducing the RF transmit power of the wireless communication device according to a first emission requirement different from a second emission requirement, and
　　reducing the RF transmit power of the wireless communication device based on the second emission requirement, when RF transmission is from a given modem of the wireless communication device and the another device is not tethered to the wireless communication device.

2. The method of claim 1, wherein the another device is a computer or headset.

3. A method for emission control at a wireless communication device, the method comprising:
　controlling, by a processing device at the wireless communication device,
　　when proximity of a user to the wireless communication device is detected, reducing radio frequency (RF) transmit power of the wireless communication device to satisfy a predetermined emission requirement, wherein an amount of reduction in RF transmit power is determined according to a total RF power $P_{TX\_TOTAL}$ including a first RF power of an RF transmitter in a Wireless Wide-Area Network (WWAN) modem and a second RF power of an RF transmitter in a Wireless Local Area Network (WLAN) modem of the wireless communication device,
　　when the wireless communication device is in a voice call and using a speakerphone mode, reducing the RF transmit power of the wireless communication device according to a first emission requirement different from a second emission requirement, and
　　reducing the RF transmit power of the wireless communication device based on the second emission requirement, when the wireless communication device is not in a voice call and using the speakerphone mode.

* * * * *